US009057175B2

(12) United States Patent
Saotome

(10) Patent No.: US 9,057,175 B2
(45) Date of Patent: Jun. 16, 2015

(54) CONSTRUCTION MACHINE WITH HYDRAULIC CIRCUIT

(71) Applicant: KOBELCO CONSTRUCTION MACHINERY CO., LTD., Hiroshima-shi (JP)

(72) Inventor: Yoshimi Saotome, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 424 days.

(21) Appl. No.: 13/669,794

(22) Filed: Nov. 6, 2012

(65) Prior Publication Data

US 2013/0115035 A1 May 9, 2013

(30) Foreign Application Priority Data

Nov. 9, 2011 (JP) ................................ 2011-245537

(51) Int. Cl.
*F16D 31/02* (2006.01)
*E02F 9/22* (2006.01)

(52) U.S. Cl.
CPC ..... *E02F 9/2239* (2013.01); *F15B 2211/20576* (2013.01); *F15B 2211/265* (2013.01); *F15B 2211/3116* (2013.01); *F15B 2211/7135* (2013.01)

(58) Field of Classification Search
CPC ..................................................... E02F 9/2239
See application file for complete search history.

(56) References Cited

U.S. PATENT DOCUMENTS

| | | | | |
|---|---|---|---|---|
| 4,073,141 | A * | 2/1978 | Lohbauer | 60/421 |
| 6,330,797 | B1 | 12/2001 | Kondo | |
| 8,051,651 | B2 * | 11/2011 | Cochran et al. | 60/428 |
| 2003/0089106 | A1 * | 5/2003 | Ioku et al. | 60/328 |
| 2006/0048508 | A1 * | 3/2006 | Nakamura et al. | 60/422 |
| 2008/0236154 | A1 * | 10/2008 | Koo | 60/421 |

FOREIGN PATENT DOCUMENTS

| | | |
|---|---|---|
| EP | 0 927 794 A1 | 7/1999 |
| JP | 3681833 | 5/2005 |

OTHER PUBLICATIONS

Extended European Search Report issued May 28, 2013, in European Patent Application No. 12191819.7.

* cited by examiner

*Primary Examiner* — Nathaniel Wiehe
*Assistant Examiner* — Dustin T Nguyen
(74) *Attorney, Agent, or Firm* — Oblon, McClelland, Maier & Neustadt, L.L.P.

(57) ABSTRACT

Provided is a construction machine including a first circuit with a boom cylinder, a second circuit with an arm cylinder and a third circuit with a slewing motor, first to third pumps discharging respective first to third pump fluids, a first flow combining valve having a first combining position for the third and first pump fluids and a first combination limiting position, a second flow combining valve having a second combining position for the third and second pump fluids and a first combination and a second combination limiting position, and a flow combination switching control section which switches the flow combining valves to their respective combination limiting positions during an arm attracting operation and switches the combining valves to their respective combination limiting positions during a single slewing operation or during a boom raising operation with no arm operation.

7 Claims, 6 Drawing Sheets

CONSTRUCTION MACHINE WITH HYDRAULIC CIRCUIT

BACKGROUND OF THE INVENTION

1. Field of the Invention

The present invention relates to a construction machine including first, second and third pumps and a hydraulic circuit including first, second and third circuits corresponding to the pumps, respectively.

2. Description of the Background Art

A background art of the present invention is described, taking a hydraulic excavator shown in FIG. 6 as an example.

This hydraulic excavator includes a crawler-type base carrier 1, an upper slewing body 2 mounted on the base carrier 1 so as to be slewable about a vertical axis X, and a working attachment 9 attached to the upper slewing body 2, the working attachment 9 including a boom 3, an arm 4 and a bucket 5. Furthermore, the hydraulic excavator includes, as hydraulic actuators, a boom cylinder 6 for raising and lowering the boom 3, an arm cylinder 7 for rotating the arm 4, a bucket cylinder 8 for rotating the bucket 5, right and left travel motors for causing the base carrier 1 to travel by driving respective right and left crawlers included in the base carrier 1, and a slewing motor for slewing the upper slewing body 2.

Such a hydraulic excavator is provided with a hydraulic circuit to drive each of the actuators. For example, there is known a hydraulic circuit having i) a first circuit including one of the right and left travel motors and the boom cylinder 6, ii) a second circuit including the other travel motor and the arm cylinder 7 and iii) a third circuit including the slewing motor, the first to third circuits being connected to respective first to third pumps, as disclosed in Japanese Patent No. 3681833.

In such a hydraulic circuit, a flow combining valve is often provided to enable a boom to be quickly raised when a boom-raising/slewing operation is performed. The boom-raising/slewing operation is a composite operation to simultaneously perform the boom raising movement of raising the boom and a slewing movement of slewing the upper slewing body. This flow combining valve, which is for switching a fluid path for hydraulic fluid discharged by the third pump, has a first position, that is, a neutral position, and a second position, adapted to be switched from the first position to the second position when the boom raising/slewing operation is performed. When switched to the second position, the flow combining valve forms a fluid path for supplying third pump fluid, which is hydraulic fluid discharged by the third pump, to the boom cylinder in parallel to the slewing motor, that is, for combining the third pump fluid with first pump fluid which is hydraulic fluid discharged from the first pump into a combined flow.

However, the flow combining valve has a response delay from the start of performing the boom raising/slewing operation by an operator until the position of the flow combining valve is actually switched from the first position to the second position, the response delay causing a time lag which may give a shock to the slewing movement. For example, in the case of starting the boom raising operation during a performance of the slewing operation, if the flow combining valve was switched from the first position to the second position simultaneously with the start of the boom raising operation, a maximum pressure (slewing pressure) of the slewing motor would be gradually reduced according to the boom raising operation with no shock; however, in actual, the flow combining valve is actually switched to the second position with a certain delay from the start of the boom raising operation (i.e. the flow combining valve is switched to the second position in a state where the boom raising operation has progressed to a certain extent), thus causing a state of the supply of the third pump to be suddenly switched from a first state where the third pump fluid is supplied only to the slewing motor to a second state where the third pump fluid is supplied to the slewing motor and the boom cylinder in parallel. The sudden switch of the supply state of the third pump fluid involves sharp change in the maximum pressure (slewing pressure) of the slewing motor from a relief pressure to a boom operating pressure, thereby generating a possibility of applying a notable shock to the slewing movement. Such a shock can cause a reduction in operability. On the other hand, there is also a demand to ensure a sufficient force for driving the arm during a horizontal attraction operation based on a combination of the boom raising movement and an arm attracting movement, i.e. a movement of the arm in a attracting direction.

SUMMARY OF THE INVENTION

An object of the present invention is to provide a construction machine capable of effectively suppressing a slewing shock due to a response delay of a flow combining valve with respect to a boom raising/slewing operation and ensuring a fine horizontal attraction operation. The present invention is directed to a construction machine, including: a base carrier; an upper slewing body mounted on the base carrier so as to be slewable; a working attachment to be attached to the upper slewing body, the working attachment including a boom capable of being raised and lowered and an arm rotatably linked to a leading end of the boom; a hydraulic actuator circuit including a first circuit with a boom cylinder for raising and lowering the boom and a boom control valve for controlling an operation of the boom cylinder, a second circuit with an arm cylinder for rotating the arm and an arm control valve for controlling an operation of the arm cylinder and a third circuit with a slewing motor for slewing the upper slewing body and a slewing control valve for controlling an operation of the slewing motor; a first pump which is a hydraulic pressure source of the first circuit; a second pump which is a hydraulic pressure source of the second circuit; a third pump which is a hydraulic pressure source of the third circuit; a first flow combining valve having a first combining position and a first combination limiting position and provided between the third pump and the third circuit; a second flow combining valve provided between the third circuit and the second circuit and having a second combining position and a second combination limiting position; and a flow combination switching control section for controlling switching the position of the first flow combining valve and the second flow combining valve. The first flow combining valve forms a fluid path for permitting third pump fluid discharged from the third pump to form a combined flow with first pump fluid discharged from the first pump in the first circuit in parallel to the slewing motor, at the first combining position, and forms a fluid path for limiting the flow of the third pump fluid into the first circuit as compared with at the first combining position, at the first combination limiting position. The second flow combining valve forms a fluid path for permitting the third pump fluid to form a combined flow with second pump fluid discharged from the second pump in the second circuit to be supplied to the arm cylinder, at the second combining position, and forms a fluid path for permitting the third pump fluid discharged from the third circuit to flow into the tank to thereby limit the supply of the third pump fluid to the arm cylinder and limit the flow of the third pump fluid into the first circuit when a slewing operation for the slewing motor is not performed, at the second combination limiting position. The flow combination switching control section switches the first flow combining valve to the first combination limiting position and the second flow combining valve to the second combining position, when an arm attracting operation for moving the arm in an attracting direction is performed, and switches the first flow combining valve to the first combining position and the second flow combining valve to the second combination limiting position, either when the slewing operation is performed without operation for either one of the boom and the arm or when a boom raising operation for moving the boom in a raising direction is performed without operation for the arm.

These and other objects, features and advantages of the present disclosure will become more apparent upon reading the following detailed description along with the accompanying drawings.

DESCRIPTION OF THE PREFERRED EMBODIMENTS

Respective embodiments of the present invention are described with reference to FIGS. 1 to 5. Any of these embodiments is applied to the hydraulic excavator shown in FIG. 6.

Figure 1:
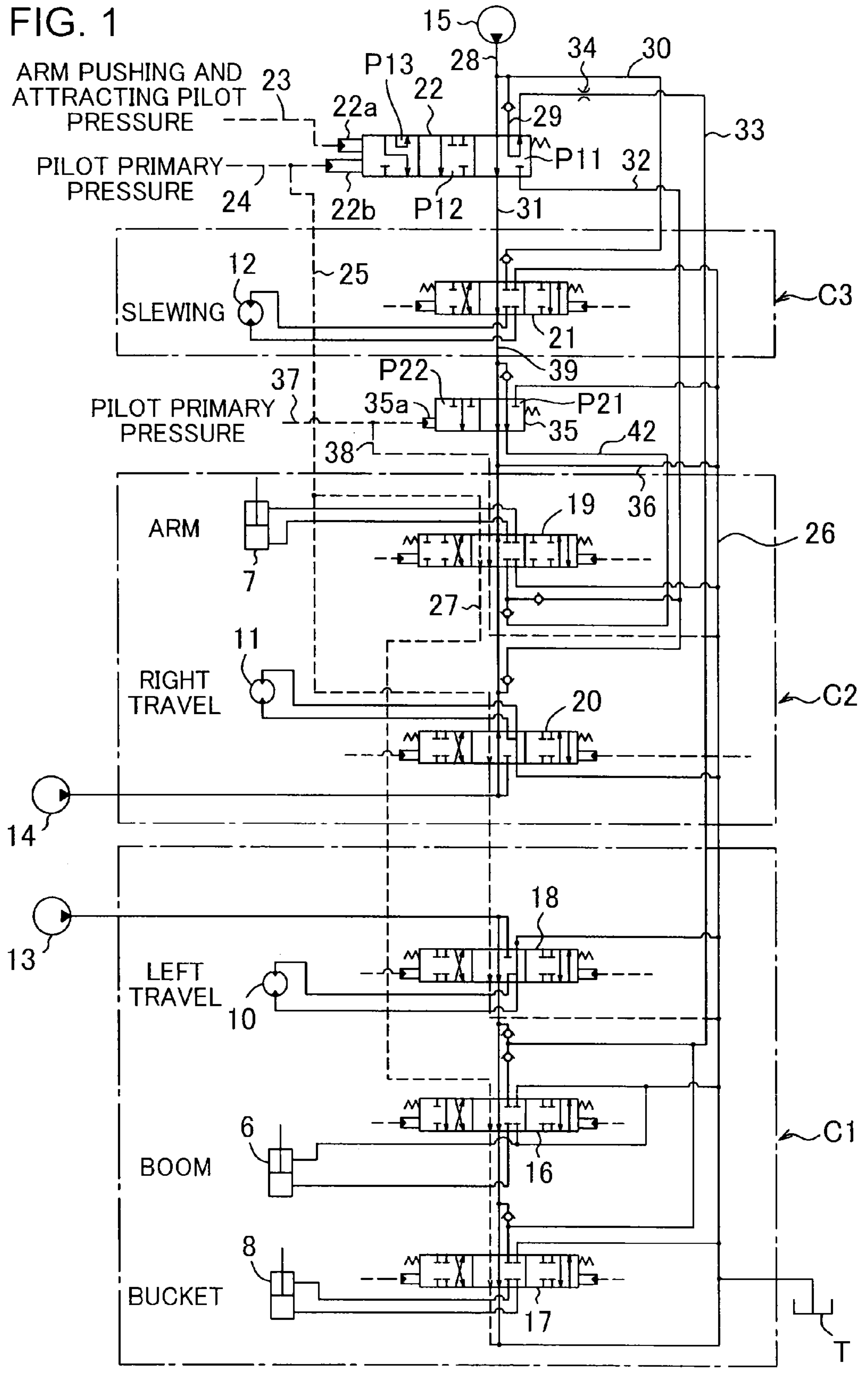
FIG. 1 is a hydraulic circuit diagram showing a first embodiment of the present invention.

FIG. 1 is a hydraulic circuit according to a first embodiment. This hydraulic circuit includes: a hydraulic actuator circuit; hydraulic pressure sources thereof including a first pump 13, a second pump 14 and a third pump 15; a first flow combining valve 22; and a second flow combining valve 35.

The hydraulic actuator circuit includes a first circuit C1, a second circuit C2 and a third circuit C3. The first circuit C1 includes a plurality of hydraulic actuators, namely, a left travel motor 10, the boom cylinder 6 and the bucket cylinder 8 each shown in FIG. 6. The second circuit C2 includes other hydraulic actuators, namely, a right travel motor 11 and the arm cylinder 7 each shown in FIG. 6, the arm cylinder 7 being so arranged as to extend to move the arm 4 in an attracting direction and contract to move the arm 4 in a pushing direction. The third circuit C3 includes only a single hydraulic actuator, namely, a slewing motor 12. The first pump 13, which is the hydraulic pressure source for the first circuit C1, supplies hydraulic fluid to the left travel motor 10, the boom cylinder 6 and the bucket cylinder 8 belonging to the first circuit C1. The second pump 14, which is the hydraulic pressure source for the second circuit C2, supplies hydraulic fluid to the right travel motor 11 and the arm cylinder 7 belonging to the second circuit C2. The third pump 15, which is the hydraulic pressure source for the third circuit C3, supplies hydraulic fluid to the slewing motor 12 belonging to the third circuit C3. Pump lines are connected to respective discharge ports of the respective pumps 13 to 15, each pump line provided with a relief valve not graphically shown.

Each of the circuits C1, C2 and C3 includes a control valve provided for each hydraulic actuator to control the operation of the hydraulic actuator, and each control valve, in this embodiment, is constituted by a directional control valve, specifically, a hydraulic pilot type spool valve. In detail, the first circuit C1 includes a boom cylinder control valve 16 for the boom cylinder 6, a bucket cylinder control valve 17 for the bucket cylinder 8 and a left travel control valve 18 for the left travel motor 10. The second circuit C2 includes an arm cylinder control valve 19 for the arm cylinder 7 and a right travel control valve 20 for the right travel motor 11, and the third circuit C3 includes a slewing control valve 21 for the slewing motor 12. Furthermore, while not shown, the second circuit C2 may include an auxiliary actuator and a control valve therefor, and the third circuit C3 may include a dozer cylinder and a control valve therefor.

In the first and second circuits C1 and C2, the respective travel control valves 18, 20 are located upstream of the other control valves in the flow of the hydraulic fluid to be given a high priority to the travel drive of the hydraulic excavator, thus preferentially supplying the hydraulic fluid discharged from the first pump 13, namely, first pump fluid, to the left travel motor 10 and the hydraulic fluid discharged from the second pump 14, namely, second pump fluid, to the right travel motor 11, respectively, during a travel operation. Accordingly, in the case of performing an operation for supplying the total amounts of the hydraulic fluid discharged by the first and second pumps 13, 14 to the respective travel motors 10, 11 on the travel control valves 18, 20 during a double travel operation of simultaneously driving the both travel motors 10, 11, no hydraulic fluid is supplied from the first and second pumps 13, 14 to any hydraulic actuator except the travel motors 10, 11 in the first and second circuits C1, C2.

The first flow combining valve 22 is provided between the third pump 15 and the third circuit C3 to ensure movements of the hydraulic actuators other than the travel motors 10, 11 during the above double travel operation, having a function of allowing the third pump fluid discharged from the third pump 15 to be supplied not only to the third circuit C3 (slewing motor 12) but also to the both first and second circuits C1, C2 during the both travel operation and under a predetermined condition. The detail thereof is described also with reference to FIG. 2.

The first flow combining valve 22 is constituted by a three-position hydraulic pilot controlled selector valve with first and second pilot ports 22*a*, 22*b* on one side thereof, having a first combining position P11 which is a neutral position for forming a fluid path for permitting the third pump fluid to flow into the first circuit C1, a first flow combination preventing position P12 for forming a fluid path for preventing the third pump fluid from flowing into the first circuit C1 and a third combining position P13 for forming a fluid path for permitting the third pump fluid to flow into both of the first circuit C1 and the second circuit C2. The first flow combining valve 22 is designed to be kept at the first combining position P11 when no pilot pressure is introduced to either of the pilot ports 22*a*, 22*b*, designed to be switched to the first flow combination preventing position P12 when the pilot pressure is introduced to the first pilot port 22*a* and designed to be switched to the third combining position P13 when the pilot pressure is introduced to the second pilot port 22*b*.

To the first pilot port 22*a* is connected a first pilot line 23, through which both of an arm pushing pilot pressure and an arm attracting pilot pressure are introduced as the pilot pressure to the first pilot port 22*a*. The arm pushing pilot pressure is a pilot pressure introduced to the arm control valve 19 when an arm pushing operation for rotating the arm 4 in a pushing direction (the direction in which the leading end of the arm 4 is displaced forward) is performed, and the arm attracting pilot pressure is a pilot pressure introduced to the arm control valve 19 when an arm attracting operation of rotating the arm 4 in a attracting direction (the direction in which the leading end of the arm 4 is displaced backward) is performed. Accordingly, upon either of the arm pushing operation and the arm attracting operation, the pilot pressure is introduced to the first pilot port 22*a* and the first flow combining valve 22 is switched to the first flow combination preventing position P12.

To the second pilot port 22*b* is connected a second pilot line 24, through which a pilot primary pressure, i.e., a pressure output from a pilot pump not graphically shown, is introduced to the second pilot port 22*b*. From the second pilot line 24A is branched off a first branch pilot line 25, which can be connected to a tank line 26 through respective pilot passages of both of the right and left travel control valves 20, 18. Each pilot passage is opened only when the corresponding one of the travel control valve 20, 18 is at a neutral position while being cut off when the corresponding one of the travel control valve 20, 18 is operated outside their respective neutral positions. Furthermore, a second branch pilot line 27 is branched off from the first branch pilot line 25 at a position upstream of the both travel control valves 20, 18. The second branch pilot line 27 includes respective pilot passages formed in the arm, boom and bucket control valves 19, 16 and 17, these pilot passages being arranged in series. These pilot passages are opened only when the control valves 19, 16 and 17 are at their neutral positions, while being cut off when the control valves 19, 16 and 17 are operated outside their respective neutral positions. Only when all the pilot passages are open, the second branch pilot line 27 brings the first branch pilot line 25 into communication with the tank line 26.

Hence, only when a travel operation and at least one of attachment operations, namely, an arm operation, a boom operation and a bucket operation, are performed, the both branch pilot lines 25, 27 are cut off from the tank line 26, thereby allowing the pilot primary pressure to be introduced to the second pilot port 22*b* to switch the flow combining valve 22 to the third combining position P13.

The first flow combining valve 22 includes first and second input ports and first, second and third output ports. The first input port is connected to the discharge port of the third pump 15 through a pump line 28, and the second input port is connected to a first branch line 29, out of the first branch line 29 and a second branch line 30 each branched off from the common pump line 28. The first output port is connected to an unload line 31, which is connectable to the tank line 26 via an unload passage of the slewing control valve 21 and the second flow combining valve 35. The second output port is connected to the arm control valve 19 through an arm line 32. The third output port is connected to the boom control valve 16 through a boom line 33, which is provided with a throttle 34.

Figure 2:
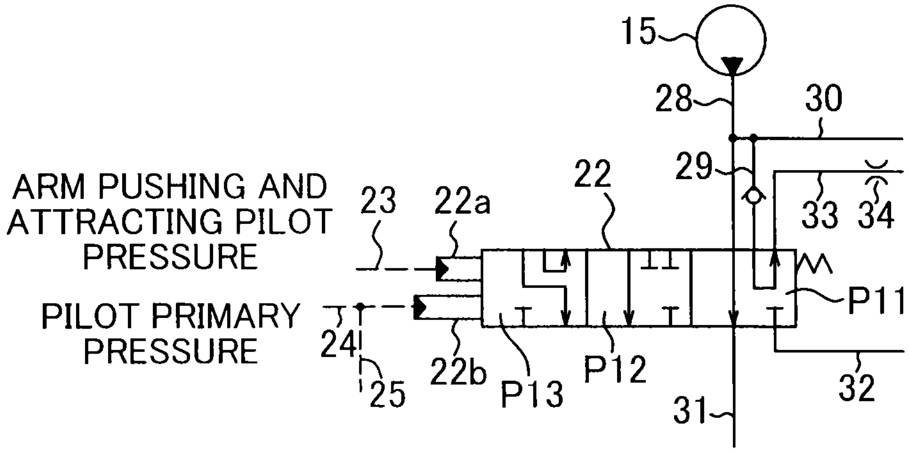
FIG. 2 is an enlarged view of a flow combining valve in the first embodiment.

As shown in FIG. 2, the first flow combining valve 22, at the first combining position P11, forms a fluid path for connecting the first and second input ports to the first and third output ports respectively while blocking the second output port. The first flow combining valve 22, at the first flow combination preventing position P12, forms a fluid path for connecting the first input port to the first output port while blocking the other ports, namely, the second input port and the second and third output ports. The first flow combining valve 22, at the third combining position P13, forms a fluid path for connecting the first and second input ports to the second and third output ports respectively while blocking the first output port.

The second flow combining valve 35 is interposed between the third circuit C3 and the second circuit C2, specifically, connected to an unload line 39 which is a discharge fluid path of the third circuit C3, to select a fluid path between a fluid path for returning the third pump fluid discharged from the third circuit C3 to a tank T via the unload line 39 and a fluid path for bringing the third pump fluid into a combined flow with the second pump fluid to the arm cylinder 7 of the second circuit C2, that is, for combining the third pump fluid with the second pump fluid in the second circuit C2 to form the combined flow toward the arm cylinder 7.

Specifically, the second flow combining valve 35 is constituted by a two-position hydraulic pilot controlled selector valve including a pilot port 35*a* on one side thereof, having a second flow combination preventing position P21, which is a neutral position, and a second combining position P22. The second flow combining valve 35 is kept at the second flow combination preventing position P21 when no pilot pressure is introduced to the pilot port 35*a*, and, at this position, connects the unload line 39 to the tank connection line 36 communicated with the tank line 26 to thereby return the third pump fluid fed via the unload line 31 and the slewing control valve 21 of the third circuit C3 to the tank T through a tank connection line 36 and the tank line 26. On the other hand, the second flow combining valve 35 is switched to the second combining position P22 when the pilot pressure is introduced to the pilot port 35*a* and, at this position, separates the unload line 39 from the tank connection line 36 and connecting it to the arm supply line 42 to thereby supply the third pump fluid to the arm control valve 19 through an arm supply line 42.

A pilot line 37 is connected to the pilot port 35*a* of the second flow combining valve 35, and, through the pilot line 37, the pilot primary pressure, i.e. the hydraulic pressure output from the pilot hydraulic pressure source not graphically shown is input as the pilot pressure to the pilot port 35*a* via through the pilot line 37. From the pilot line 37 is branched off a branch pilot line 38, which is connectable to the tank line 26 through a pilot passage which is opened when the arm control valve 19 is at its neutral position. In other words, the arm control valve 19 opens the branch pilot line 38 to make communication of the pilot line 37 with the tank T when no arm operation is performed, thereby preventing the pilot primary pressure from introduction to the second flow combining valve 35 to keep the second flow combining valve 35 at the second flow combination preventing position P21.

Thus, this first embodiment (further in second and third embodiments to be described later) includes a flow combination switching control section for controlling the position switch of the both flow combining valves 22, 35, which section is constituted by a pilot circuit connected to the pilot ports 22*a*, 22*b* of the first flow combining valve 22 and the pilot port 35*a* of the second flow combining valve 35, the pilot circuit including the pilot hydraulic pressure source not graphically shown and the pilot lines 24, 25, 27, 37 and 38 with respective pilot passages provided in the control valves 16 to 20 excluding the slewing control valve 21 configures a flow combination switching control section.

Next will be described functions of this hydraulic circuit.

(1) Initial State

In an initial state where none of the hydraulic actuators is operated and thus no pilot pressure is supplied to any of the pilot ports 22*a*, 22*b* of the first flow combining valve 22, the first flow combining valve 22 is kept at the neutral position, that is, the first combining position P11 graphically shown.

The first flow combining valve 22, at this first combining position P11, forms the fluid path for permitting the third pump fluid to be supplied to the boom and bucket control valves 16, 17 in the first circuit C1 through the first branch line 29 and the boom line 33. Besides, since the pump line 28 of the third pump 15 makes fluid communication with the tank T through the unload line 31, the slewing control valve 21 kept at the neutral position, the tank connection line 36 and the tank line 26 unless the slewing operation is performed, the pump pressure of the third pump 15 is not increased even with the operation of the boom cylinder 6 or the bucket cylinder 8 in the first circuit C1. Thus, there occurs no combined flow of the third pump fluid with the first pump fluid in the first circuit C1.

(2) Single Boom Cylinder Operation and Single Rotating Operation

As described above, no slewing operation causes no increase in the pump pressure of the third pump 15, thus preventing the third pump fluid from forming the combined flow with the first pump fluid regardless of the operation for raising or lowering the boom cylinder 6. In other words, there is no possibility of the supply of the third pump fluid as the combined flow to the boom cylinder 6 through the boom line 33. On the other hand, when only the slewing control valve 21 is operated, the slewing motor 12 is driven, while the first flow combining valve 22 is still kept at the neutral position, namely, the first combining position P11.

(3) Boom/Slewing Operation

When a transition is made from the state shown in FIG. 1 or a state where the single slewing operation is performed to a state where the boom raising or lowering operation and the slewing operation are simultaneously performed, the slewing control valve 21 blocking between the pump line 28 and the unload line 39 allows the pump pressure to be increased with the operation for the boom. Thus, the third pump fluid is supplied to the boom control valve 16 in parallel via the boom line 33 as well as to the slewing control valve 21. In short, with boom/slewing operation, the third pump fluid is brought into the combined flow, that is, combined with the first pump fluid, in the first circuit C1 to be supplied to the boom cylinder 6. Because the slewing pressure is generally greater than a boom holding pressure, the boom raising/slewing operation is performed in agreement with the boom holding pressure at a low pressure side.

On the other hand, the pilot circuit for the second flow combining valve 35 keeps the second flow combining valve 35 at the second flow combination preventing position P21 graphically shown, because the pilot pressure cannot be produced in the pilot line 37 connected to the pilot port 35*a* of the second flow combining valve 35 unless the arm control valve 19 is moved off the neutral position to cut off the branch pilot line 38, i.e., unless the operation for the arm cylinder 7 is not performed. Accordingly, the circuit, as a whole, is kept in a "first state" where the first and second flow combining valves 22, 35 are kept at the first combining position P11 and the second flow combination preventing position P21, respectively.

Thus, in this circuit, when the operation is switched, for example, from the single slewing operation to the boom/slewing operation including the boom raising/slewing operation, bringing the third pump fluid into the combined flow to the boom cylinder 6 in the first circuit C1 is started while the first flow combining valve 22 is still kept at the neutral position, namely, the first combining position P11; therefore, unlike the background art, there is no sharp change in the slewing pressure, that is, no slewing shock due to a response delay in the position switch of the first flow combining valve 22, i.e., the delay of the start of the flow combination.

On the other hand, since the third pump fluid is returned to the tank T to thereby fail to form the combined flow with the first pump fluid to the boom cylinder 6 unless the slewing operation is performed, there is no increase in the speed of the boom raising movement caused by the flow combination of the third flow, even if the boom raising operation is performed in this state, that is, the single boom raising operation is performed. This allows an operator to perform operations with usual feeling and motions. Furthermore, the second flow combining valve 35, introducing the third pump fluid to the tank connection line 36 directly (bypassing the second circuit C2) when the slewing operation is not performed as described above, contributes to a reduced pressure loss in the return side fluid path during absence of the arm operation.

Besides, the throttle 34 provided in the boom line 33 increases the slewing pressure during the simultaneous boom/slewing operation to enable slewing acceleration performance to be ensured.

(4) Arm Operation

Upon the performance of the arm pushing operation or the arm attracting operation, the pilot pressure for the operation is also introduced to the first pilot port 22*a* of the first flow combining valve 22 to switch the first flow combining valve 22 to the first flow combination preventing position P12. Meanwhile, as to the second flow combining valve 35, the arm control valve 19 is moved off the neutral position to cut off the branch pilot line 38, thereby permitting the pilot primary pressure to be introduced into the pilot port 35*a* of the second flow combining valve 35; thus, the second flow combining valve 35 is switched to the second combining preventing position P21.

In summary, the arm pushing or attracting operation causes a "second state" where the first flow combining valve 22 and the second flow combining valve 35 are switched to the first flow combination preventing position P12 and the second combining position P22, respectively. In this second state, the first flow combining valve 22 cuts off the boom line 33 from the pump line 28, while the second flow combining valve 35 connects the unload line 31 and the unload line 39 at a discharge side of the slewing control valve 21 to the arm control valve 19 through the arm supply line 42, thereby permitting the third pump fluid to form the combined flow with the second pump fluid to be supplied to the arm cylinder 7. The third pump fluid is thus brought into the combined flow to the arm cylinder 7. Thus bringing the third pump fluid into the combined flow to the arm cylinder 7 arm cylinder 7 gives the arm cylinder 7 priority on receiving the supply of the third pump fluid in the so-called horizontal attraction operation based on the simultaneous performance of the boom raising operation and the arm attracting operation, thereby enabling a fine horizontal attraction movement to be performed.

(5) Both Travel Operation and Other Actuator Operations

The above description is made as to the case of absence of operation for the right and left travel control valves 18, 20; in the case of presence of both of the right and left travel control valves 18, 20, i.e., when the double travel operation is performed, a state of flow combination is switched as follows depending on whether presence or absence of respective operations of the other actuators.

When the right and left travel control valves 18, 20 are operated and the other control valves are not operated, the pilot pressure is introduced to neither one of the first and second pilot ports 22*a*, 22*b* of the first flow combining valve 22, thus keeping the first flow combining valve 22 at the first combining position P11. Specifically, unless the arm control valve 19 is operated, the pilot pressure is not supplied to the first pilot port 22*a*. Meanwhile, the arm control valve 19, the boom control valve 16 and the bucket control valve 17, all of which are kept at their respective neutral positions, open the second branch pilot line 27 to connect the first pilot line 25 to the tank line 26, thereby hindering the pilot primary pressure to be introduced into the second pilot port 22*b* through the pilot line 24 joined to the pilot line 25.

In contrast to this, when at least one of the other actuators, namely, the arm control valve 19, the boom control valve 16 and the bucket control valve 17, is operated simultaneously with the double travel operation, the operated control valve cuts off the branch pilot line 27 to permit the pilot primary pressure to be introduced into the second pilot port 22*b*, thereby switching the first flow combining valve 22 to the third flow combination preventing position P13. At the third flow combination preventing position P13, the first flow combining valve 22 permits the third pump fluid to flow into the both first and second circuits C1, C2 through the arm line 32 and the boom line 33, thereby enabling the actuator actions other than the travel actions to be ensured during the double travel operations.

Figure 3:
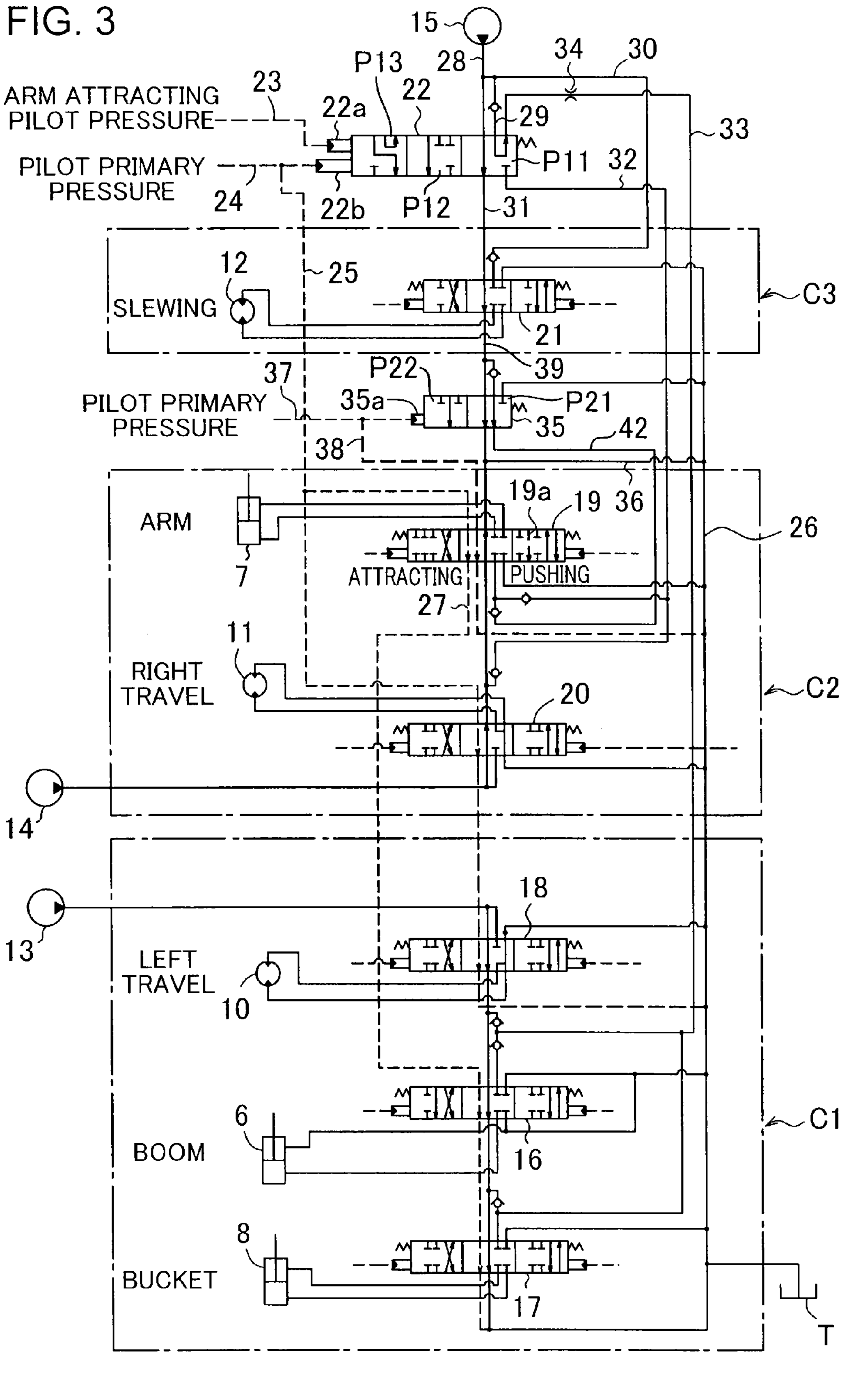
FIG. 3 is a hydraulic circuit diagram showing a second embodiment of the present invention.

Next will be described a second embodiment of the present invention with reference to FIG. 3. The following second to fourth embodiments are described only about their respective differences from the first embodiment.

The above-mentioned arm attracting operation is an operation for extending the arm cylinder 7 and, for increasing the speed of the movement of the arm 4, it is desirable to bring the third pump fluid into the combined flow with the second pump fluid to the arm cylinder 7 as in the first embodiment. Meanwhile, since respective weights of the arm 4 and the bucket 5 is applied to the arm cylinder 7 in a direction of contracting the arm cylinder 7, bringing the third pump fluid into the combined flow to the arm cylinder 7 even during the arm pushing operation for contracting the arm cylinder 7 involves a problem of an increase in a pressure loss at a return side of the arm cylinder 7. On the other hand, there is poor necessity for bringing the third pump fluid into a combined flow for the arm pushing operation as compared with for the arm attracting operation.

Accordingly, in the second embodiment, the flow combination switching control section is so configured as to keep the second flow combining valve 35 at the second flow combination preventing position P21 during the arm attracting operation to prevent the third pump fluid from forming the combined flow with the second pump fluid to the arm cylinder 7. Specifically, the arm control valve 19 is configured to block the branch pilot line 38 for the second flow combining valve 35, as in the first embodiment, at the position corresponding to the arm attracting operation out of the switch positions of the arm control valve 19 while including a pilot passage 19*a* which opens the branch pilot line 38 as shown by thick broken line in FIG. 3 at the position corresponding to the arm pushing operation.

By opening the branch pilot line 38, the pilot passage 19*a* connects the pilot line 37 joined to the pilot port 35*a* of the second flow combining valve 35 to the tank line 26 to hinder the pilot primary pressure to be introduced into the pilot port 35*a* through the pilot line 37, thereby keeping the second flow combining valve 35 at the second flow combination preventing position P21 to prevent the third pump fluid from forming the combined flow with the second pump fluid to the arm cylinder 7 during the arm pushing operation. This reduces a pressure loss at the return side of the arm cylinder 7. Thus, the branch pilot line 38 including the pilot passage 19*a* corresponds to a "tank communication line" which brings the pilot line 37 into communication with the tank to keep the second flow combining valve 35 at the second flow combination preventing position P21 when the arm pushing operation is performed.

In this second embodiment, for the first flow combining valve 22, the pilot circuit is preferably configured so as to introduce only the arm attracting pilot pressure out of the arm attracting pilot pressure and the arm pushing pilot pressure into the first pilot port 22*a*. This makes it possible to permit the third pump fluid to form the combined flow with the first pump fluid to the boom cylinder 6 during the arm pushing operation.

Next will be described a third embodiment with reference to FIG. 4.

In this third embodiment, the flow combination switching control section is so configured as to inhibit the third pump fluid from forming a combined flow with the first pump fluid to the boom cylinder during a composite operation based on simultaneous performances of a boom lowering operation and a slewing operation, namely, a boom lowering/slewing operation. That is because, while bringing the third pump fluid into the combined flow with the first pump fluid to the boom cylinder 6 is desirable during the boom "raising/slewing" operation, as described above, forming the combined flow during the boom "lowering/slewing" operation may cause a slewing pressure to be reduced in agreement with a low pressure at a boom lowering side, thereby generating possibility of reduction in slewing acceleration performance.

Specifically, a hydraulic circuit according to the third embodiment further includes a shuttle valve 40 and a branch pilot line 43 in addition to constituent elements of the circuit according to the first embodiment. The branch pilot line 43 is branched off from the pilot line 37 for the second flow combining valve 35 to reach the shuttle valve 40. This shuttle valve 40 is provided in the pilot line 23 leading to the first pilot port 22*a* of the first flow combining valve 22. Unlike the first embodiment, introduced to this pilot line 23 is a boom lowering pilot pressure, a pilot pressure for the boom lowering operation. The shuttle valve 40 selects a higher one between the boom lowering pilot pressure and the pilot primary pressure introduced through the branch pilot line 43 and introduces the selected pressure intto the first pilot port 22*a* of the first flow combining valve 22.

This shuttle valve 40 according to the third embodiment introduces, during the boom lowering operation, the boom lowering pilot pressure to the first pilot port 22*a* of the first flow combining valve 22 to switch the first flow combining valve 22 to the first flow combination preventing position P12, thereby blocking the boom line 33. This makes it possible to prevent the third pump fluid from forming the combined flow with the first pump fluid to the boom cylinder 6 during the boom lowering operation regardless of presence or absence of the slewing operation, thereby enabling a fine slewing performance to be ensured even during the boom lowering operation.

Besides, even in the case of absence of the boom lowering operation, the presence of the arm operation make the arm control valve 19 cut off the branch pilot line 38 to permit the pilot primary pressure to be supplied to the shuttle valve 40 through the branch pilot line 39, and the shuttle valve 40 introduces the pilot primary pressure into the first pilot port 22*a* of the first flow combining valve 22; thus, also in the case, the first flow combining valve 22 is switched to the first flow combination preventing position P12, as in the first embodiment.

Next will be described a fourth embodiment with reference to FIG. 5.

In this fourth embodiment, the flow combination switching control section is so configured as to inhibit the third pump fluid from forming the combined flow with the second pump fluid to the arm cylinder 7 during an arm/bucket operation based on simultaneous performances of an arm operation and a bucket operation. That is because, if the third pump fluid is supplied to the arm cylinder 7 during an excavating operation based on the arm/bucket operation, the excavation resistance may open the relief valve provided for the arm cylinder 7 to make working horsepower great, thus deteriorating the movement of the bucket operated by the remaining horsepower.

Specifically, this fourth embodiment additionally includes an auxiliary pilot port 35*b* provided in the second flow combining valve 35 and located at a side opposite to the pilot port 35*a* of the second flow combining valve 35, i.e. at a spring side, and a pilot line 41 connected to this auxiliary pilot port 35*b*, and, through the pilot line 41 is introduced a pilot pressure for a bucket excavation operation, i.e. an operation for extending the bucket cylinder 8.

The pilot pressure for the bucket excavation operation thus introduced to the auxiliary pilot port 35*b* at the opposite side of the pilot port 35*a* during the bucket excavation operation keeps the second flow combining valve 35 at the second flow combination preventing position P21 against the pilot primary pressure introduced to the pilot port 35*a*, thereby preventing the third pump fluid from forming the combined flow to the arm cylinder 7 even with the presence of the arm operation. This allows a sufficient bucket flow rate and fine bucket movements to be ensured, thus shortening an operation cycle time, even if the relief valve provided for the arm cylinder 7 is opened at the time of excavation by the arm/bucket operation.

Figure 4:
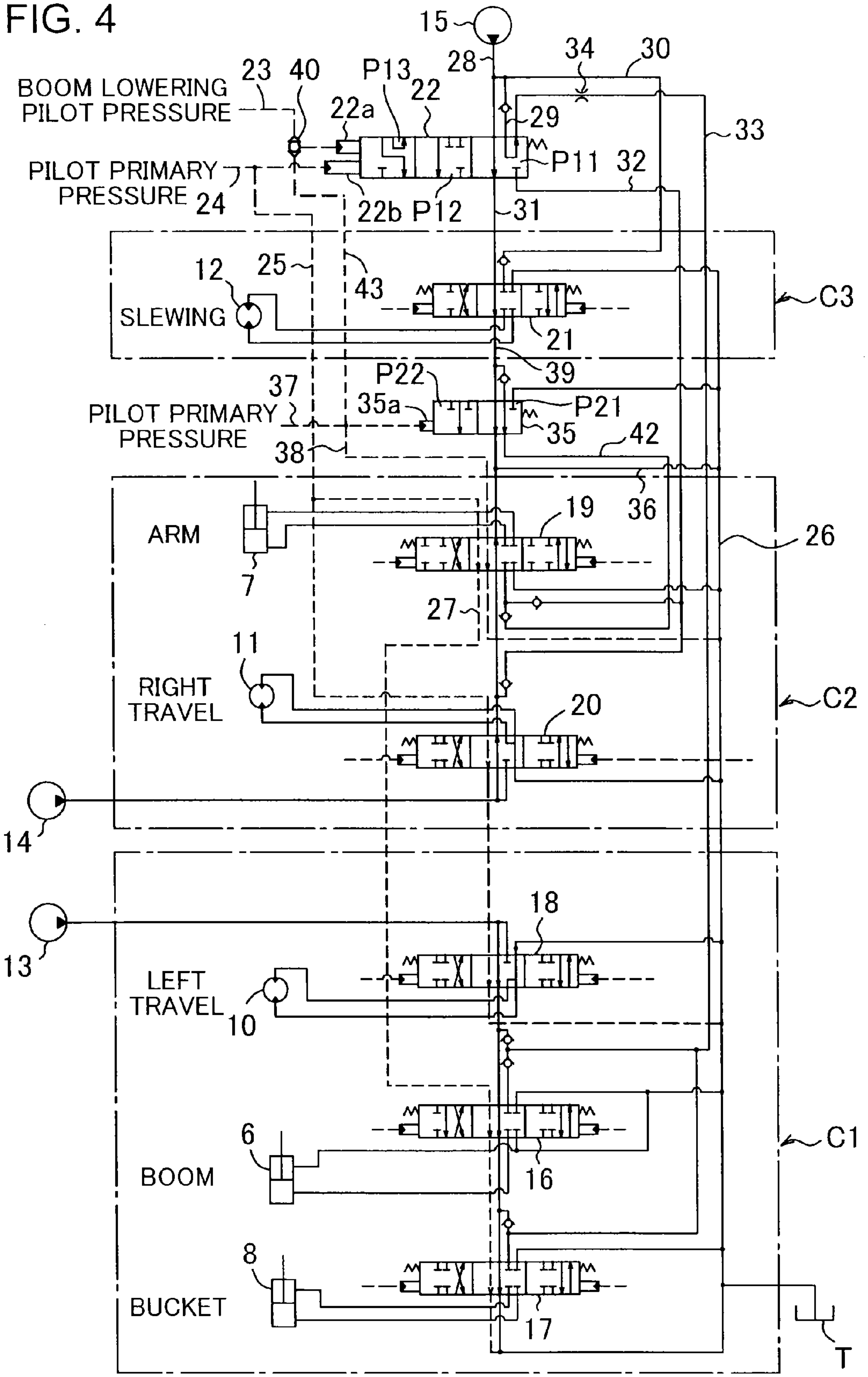
FIG. 4 is a hydraulic circuit diagram showing a third embodiment of the present invention.
Figure 5:
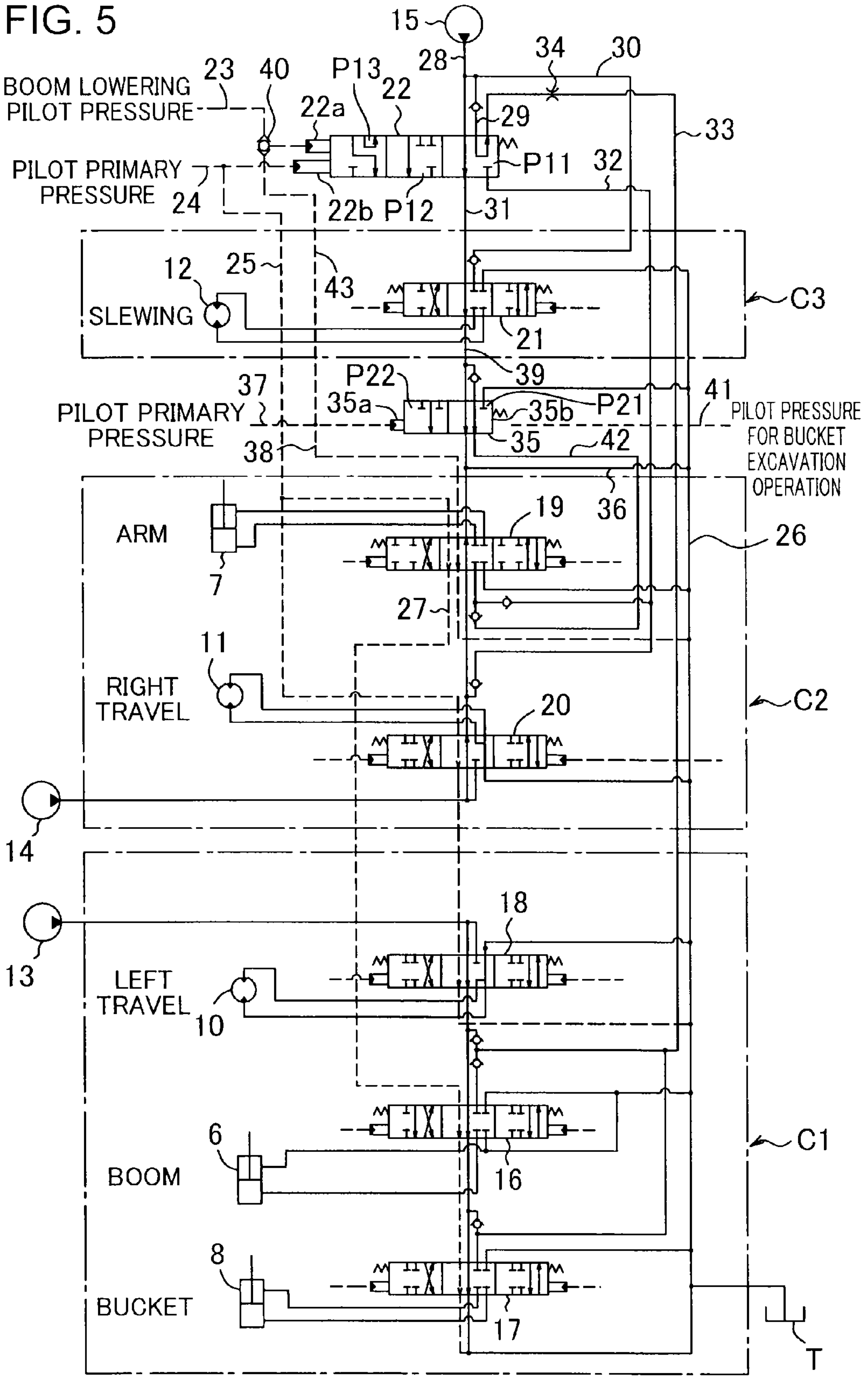
FIG. 5 is a hydraulic circuit diagram showing a fourth embodiment of the present invention.
Figure 6:
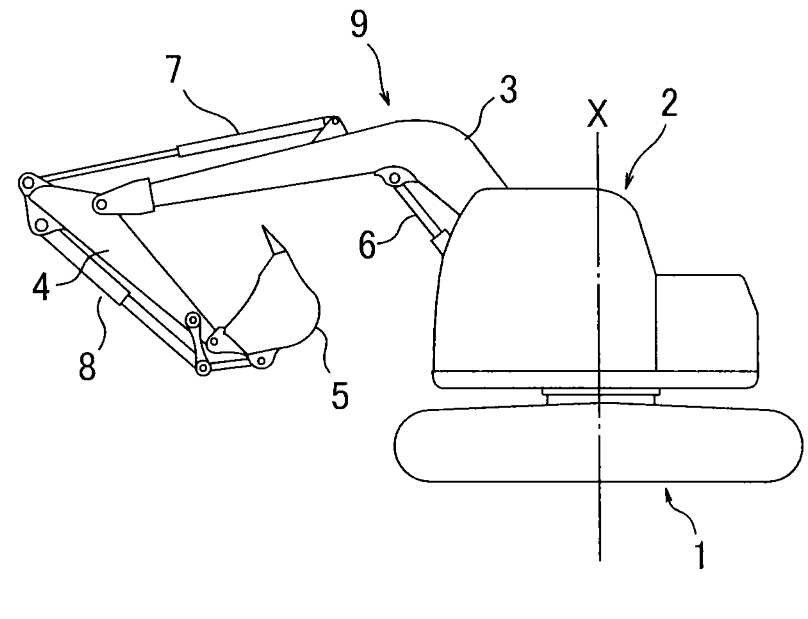
FIG. 6 is a schematic side view of a hydraulic excavator as an example of a construction machine to which the present invention can be applied.

Although the circuit shown in FIG. 5 is based on the circuit according to the third embodiment shown in FIG. 4, the configuration for the second flow combining valve 35 of the fourth embodiment can also be applied to the circuits according to the first and second embodiments.

Besides, the present invention can include, for example, the following embodiments other than the above-mentioned embodiments.

Each of the "first combination limiting position" of a first flow combining valve and a "second combination limiting position" of a second flow combining valve according to the present invention is not limited to a position for forming fluid paths for fully preventing the third pump fluid from forming the combined flow such as the first flow combination preventing position P12 and the second flow combination preventing position P21 according to the above embodiments; each of the flow combination limiting positions may be one for forming a fluid path for limiting the flow rate of the third pump fluid in the combined flow with the corresponding one of the first and second pump fluids in respective first and second circuits, as compared with the first combining position and the second combining position, respectively.

Besides, the present invention can also be applied to a construction machine comprising a circuit other than respective circuits according to the above embodiments in which the travel motors 10, 11 are arranged at most upstream sides of the first and second circuits C1, C2 to give a priority to travelling operation.

The flow combination switching control section, while being configured by the pilot circuits for the both flow combining valves 22, 35 to control the position switch of the flow combining valves 22, 35 in the above respective embodiments, may be, for example, configured by an operation detector (e.g. pilot pressure sensor) for detecting the operation of each control valve, an electromagnetic selector valve for switching the supply of the pilot pressure to the flow combining valve 22 and a control circuit for controlling the switch of the electromagnetic selector valve based on a detection signal produced by the operation detector.

The construction machine according to the present invention is not limited to the hydraulic excavator. The present invention can also be applied to a crushing machine, a demolition machine or the like including a breaker or an openable crusher adapted to be attached to the base body of the hydraulic excavator instead of the bucket.

As described above, the present invention provides a construction machine capable of effectively suppressing a slewing shock due to a response delay of a flow combining valve to a boom raising/slewing operation and ensuring a fine horizontal attraction movement. This construction machine includes: a base carrier; an upper slewing body mounted on the base carrier so as to be slewable; a working attachment to be attached to the upper slewing body, the working attachment including a boom capable of being raised and lowered and an arm rotatably linked to a leading end of the boom; a hydraulic actuator circuit including a first circuit with a boom cylinder for raising and lowering the boom and a boom control valve for controlling an operation of the boom cylinder, a second circuit with an arm cylinder for rotating the arm and an arm control valve for controlling an operation of the arm cylinder and a third circuit with a slewing motor for slewing the upper slewing body and a slewing control valve for controlling an operation of the slewing motor; a first pump which is a hydraulic pressure source of the first circuit; a second pump which is a hydraulic pressure source of the second circuit; a third pump which is a hydraulic pressure source of the third circuit; a first flow combining valve having a first combining position and a first combination limiting position and provided between the third pump and the third circuit; a second flow combining valve provided between the third circuit and the second circuit and having a second combining position and a second combination limiting position; and a flow combination switching control section for controlling switching the position of the first flow combining valve and the second flow combining valve. The first flow combining valve forms a fluid path for permitting third pump fluid discharged from the third pump to form a combined flow with first pump fluid discharged from the first pump in the first circuit in parallel to the slewing motor, at the first combining position, and forms a fluid path for limiting the flow of the third pump fluid into the first circuit as compared with at the first combining position, at the first combination limiting position. The second flow combining valve forms a fluid path for permitting the third pump fluid to form a combined flow with second pump fluid discharged from the second pump in the second circuit to be supplied to the arm cylinder, at the second combining position, and forms a fluid path for permitting the third pump fluid discharged from the third circuit to flow into the tank to thereby limit the supply of the third pump fluid to the arm cylinder and limit the flow of the third pump fluid into the first circuit when a slewing operation for the slewing motor is not performed, at the second combination limiting position. The flow combination switching control section switches the first flow combining valve to the first combination limiting position and the second flow combining valve to the second combining position, when an arm attracting operation for moving the arm in an attracting direction is performed, and switches the first flow combining valve to the first combining position and the second flow combining valve to the second combination limiting position, either when the slewing operation is performed without operation for either one of the boom and the arm or when a boom raising operation for moving the boom in a raising direction is performed without operation for the arm.

In this construction machine, unlike the conventional technology in which the position of a flow combining valve is switched when a transition is made from a single slewing operation to a boom raising/slewing operation, there is no sharp change in slewing pressure, i.e., no slewing shock due to a response delay of the switch, i.e., a delay in the switch of a state of forming the combined flow by the third pump fluid, because the first flow combining valve is kept at the first combining position, i.e., a position for permitting the third pump fluid to be flowed into the first circuit as the combined flow, either during the single slewing operation or during the boom raising/slewing operation. Besides, when the arm operation is not performed, the second flow combining valve is kept at the second combination limiting position to limit the combined flow of the third pump fluid into the first circuit by returning the third pump fluid to a tank in a condition of absence of the slewing operation, that is, limit the combined flow of the third pump fluid into the first circuit during the single boom operation, thus suppressing the increase in the speed of the boom raising movement due to the combined flow to thereby allow an operator to perform respective operations with usual feeding and motions.

On the other hand, the second flow combining valve is switched to the second combining position at least during the arm attracting operation to form the fluid path for permitting the third pump fluid discharged from the third circuit to form the combined flow toward the arm cylinder, thus preventing the arm movement from being relatively delayed due to the combined flow of the third pump fluid with the first pump fluid in the first circuit for giving a priority to driving the boom cylinder, for example, during a so-called horizontal attraction operation based on the simultaneous performance of the boom raising operation and the arm attracting operation, thereby enabling a fine horizontal attraction operation to be ensured.

In the present invention, it is preferable to further include a throttle in a passage for bringing the third pump fluid into the combined flow with the first pump fluid in the first circuit when the first flow combining valve is at the first combining position. This throttle can increase a slewing pressure by an reduction in the flow rate of the third pump fluid brought into the combined flow with the first pump fluid during the boom raising/slewing operation, thus enabling slewing acceleration performance to be ensured.

In the present invention, it is preferable to dispose the second flow combining valve so as to return the third pump fluid from the third circuit to the tank through the slewing control valve and the second flow combining valve bypassing the first and second circuits when no slewing operation is performed and the second flow combining valve is at the second combination limiting position. Thus returning the third pump fluid directly to the tank bypassing the first and second circuits enables the pressure loss at a return side when no slewing operation is performed to be reduced.

In the case of the arm cylinder arranged so as to extend to move the arm in a attracting direction and contract to move the arm in a pushing direction, it is preferable that the flow combination switching control section keeps the second flow combining valve at the second combination limiting position when the arm pushing operation for moving the arm in the pushing direction is performed. This makes it possible to prevent the pressure loss at the return side of the arm cylinder from increase during the arm pushing operation. Specifically, the arm attracting operation, which is an operation for extending the arm cylinder, prefers that the third pump fluid forms the combined flow with the second pump fluid to the arm cylinder, in order to increase the speed of the arm, whereas bringing the third pump fluid into the combined flow to the arm cylinder during the arm pushing operation which is an operation for contracting the arm cylinder involves a problem of increasing the pressure loss at the return side because the weights of the arm and the like is applied to the arm cylinder in a direction of contracting the arm cylinder; however, keeping the second flow combining valve at the second combination limiting position during the arm pushing operation as described above enables the pressure loss at the return side of the arm cylinder to be reduced.

Specifically, in the case of the second flow combining valve constituted by a pilot selector valve including a pilot port which is kept at the second combination limiting position when no pilot pressure is introduced to the pilot port while switched to the second combining position when the pilot pressure is introduced, preferable as the flow combination switching control section is, for example, one which includes: a pilot line connected to the pilot port of the second flow combining valve to introduce the pilot pressure to the pilot port and a tank communication line which leads to the pilot line and brings the pilot line into communication with the tank during the arm pushing operation.

The flow combination switching control section preferably sets the first flow combining valve at the first combination limiting position and the second flow combining valve at the second combination limiting position when a boom lowering operation for moving the boom in a lowering direction is performed. If the third pump fluid was brought into the combined flow in the first circuit when the boom lowering operation and the slewing direction are simultaneously performed, the slewing pressure might also decrease in agreement with a pressure at a boom lowering side which is originally low and deteriorate slewing acceleration; however switching both of the flow combining valves to their respective combination limiting positions during the boom lowering operation as described above makes it possible to ensure fine slewing performance by suppressing the combined flow of the third pump fluid to the boom cylinder.

In the case where the working attachment further includes a bucket which is rotatably attached to the leading end of the arm to perform an excavation movement and a dumping movement by the rotation thereof and the hydraulic actuator circuit further includes a bucket cylinder for rotating the bucket, it is preferable that the flow combination switching control section sets the second flow combining valve at the second combination limiting position, when an arm operation for moving the arm and a bucket operation for moving the bucket are simultaneously performed, to limit the supply of the third pump fluid to the second circuit. If the third pump fluid is brought into the combined flow to the arm cylinder during an arm/bucket operation based on simultaneous respective performances of the arm operation and the bucket operation, the movement of the bucket operated on the remaining horsepower would be promoted to be deteriorated when the circuit for the arm cylinder is relieved by excavation resistance to thereby increase working horsepower; however, limiting the flow of the third pump fluid into the second circuit during the arm/bucket operation as described above makes it possible to ensure a sufficient bucket flow rate and fine bucket movements, thus enabling an operation cycle time to be improved.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

This application is based on Japanese Patent application No. 2011-245537 filed in Japan Patent Office on Nov. 9, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine, comprising:

a base carrier;

an upper slewing body mounted on the base carrier so as to be slewable;

a working attachment to be attached to the upper slewing body, the working attachment including a boom capable of being raised and lowered and an arm rotatably linked to the leading end of the boom;

a hydraulic actuator circuit including a first circuit with a boom cylinder for raising and lowering the boom and a boom control valve for controlling an operation of the boom cylinder, a second circuit with an arm cylinder for slewing the arm and an arm control valve for controlling an operation of the arm cylinder and a third circuit with a slewing motor for slewing the upper slewing body and a slewing control valve for controlling an operation of the slewing motor;

a first pump which is a hydraulic pressure source of the first circuit;

a second pump which is a hydraulic pressure source of the second circuit;

a third pump which is a hydraulic pressure source of the third circuit;

a first flow combining valve having a first combining position and a first combination limiting position and being provided between the third pump and the third circuit;

a second flow combining valve having a second combining position and a second combination limiting position and being provided between the third circuit and the second circuit; and a flow combination switching control section for controlling the position switch of the first flow combining valve and the second flow combining valve; wherein:

the first flow combining valve forms a fluid path for permitting third pump fluid discharged from the third pump to form a combined flow with first pump fluid discharged from the first pump in the first circuit in parallel to the slewing motor, at the first combining position, and forms a fluid path for limiting the flow of the third pump fluid into the first circuit as compared with at the first combining position, at the first combination limiting position;

the second flow combining valve forms a fluid path for permitting the third pump fluid to form a combined flow with second pump fluid discharged from the second pump in the second circuit to be supplied to the arm cylinder, at the second combining position, and forms a fluid path for permitting the third pump fluid discharged from the third circuit to flow into a tank to thereby limit the supply of the third pump fluid to the arm cylinder and limit the flow of the third pump fluid into the first circuit when a slewing operation for the slewing motor is not performed, at the second combination limiting position; and the flow combination switching control section switches the first flow combining valve to the first combination limiting position and the second flow combining valve to the second combining position, respectively, when an arm attracting operation for moving the arm in an attracting direction is performed, and switches the first flow combining valve to the first combining position and the second flow combining valve to the second combination limiting position, respectively, either when the slewing operation is performed without operation for either one of the boom and the arm or when a boom raising operation for moving the boom in a raising direction is performed without operation for the arm.

2. A construction machine according to claim 1, further comprising a throttle in a passage for bringing the third pump fluid into the combined flow with the first pump fluid in the first circuit when the first flow combining valve is at the first combining position.

3. A construction machine according to claim 1, wherein the second flow combining valve is so arranged as to return the third pump fluid from the third circuit to the tank through the slewing control valve and the second flow combining valve bypassing the first and second circuits when the slewing operation is not performed and the second flow combining valve is at the second combination limiting position.

4. A construction machine according to claim 1, wherein the arm cylinder is arranged so as to extend to move the arm in a attracting direction and contract to move the arm in a pushing direction and the flow combination switching control section sets the second flow combining valve at the second combination limiting position when an arm pushing operation for moving the arm in the pushing direction is performed.

5. A construction machine according to claim 4, wherein the second flow combining valve is constituted by a pilot controlled selector valve including a pilot port, the pilot controlled selector valve being kept at the second combination limiting position when no pilot pressure is introduced to the pilot port while switched to the second combining position when the pilot pressure is introduced, and the flow combination switching control section includes: a pilot line connected to the pilot port of the second flow combining valve to introduce the pilot pressure to the pilot port; and a tank communication line which leads to the pilot line to bring the pilot line into communication with the tank during the arm pushing operation.

6. A construction machine according to claim 1, wherein the flow combination switching control section sets the first flow combining valve at the first combination limiting position and the second flow combining valve at the second combination limiting position, respectively, when a boom lowering operation for moving the boom in a lowering direction is performed.

7. A construction machine according to claim 1, wherein: the working attachment further includes a bucket which is rotatably attached to the leading end of the arm to perform an excavation movement and a dumping movement by the rotation thereof; the hydraulic actuator circuit further includes a bucket cylinder for rotating the bucket; and the flow combination switching control section sets the second flow combining valve at the second combination limiting position to limit the supply of the third pump fluid to the second circuit when an arm operation for moving the arm and a bucket operation for moving the bucket are simultaneously performed.

* * * * *